United States Patent
Herrmann et al.

(10) Patent No.: US 9,945,725 B2
(45) Date of Patent: Apr. 17, 2018

(54) THERMOPILE INFRARED SENSOR STRUCTURE WITH A HIGH FILLING LEVEL

(71) Applicant: Heimann Sensor GmbH, Dresden (DE)

(72) Inventors: Frank Herrmann, Dohna (DE); Marion Simon, Bad Schwalbach (DE); Wilhelm Leneke, Taunusstein (DE); Bodo Forg, Mainz (DE); Karlheinz Storck, Ingelheim (DE); Michael Müller, Dresden (DE); Jörg Schieferdecker, Dresden (DE)

(73) Assignee: Heimann Sensor GmbH, Dresden (DE)

( * ) Notice: Subject to any disclaimer, the term of this patent is extended or adjusted under 35 U.S.C. 154(b) by 0 days.

(21) Appl. No.: 14/379,007

(22) PCT Filed: Jan. 18, 2013

(86) PCT No.: PCT/EP2013/050881
§ 371 (c)(1),
(2) Date: Aug. 15, 2014

(87) PCT Pub. No.: WO2013/120652
PCT Pub. Date: Aug. 22, 2013

(65) Prior Publication Data
US 2016/0025571 A1  Jan. 28, 2016

(30) Foreign Application Priority Data
Feb. 16, 2012 (DE) .................. 10 2012 202 415

(51) Int. Cl.
*G01J 5/12* (2006.01)
*G01J 5/08* (2006.01)
(Continued)

(52) U.S. Cl.
CPC ................. *G01J 5/12* (2013.01); *G01J 5/023* (2013.01); *G01J 5/06* (2013.01); *G01J 5/0815* (2013.01); *G01J 5/0853* (2013.01)

(58) Field of Classification Search
CPC ...................................... G01J 5/34; G01J 5/12
See application file for complete search history.

(56) References Cited

U.S. PATENT DOCUMENTS

| 4,761,958 A | 8/1988 | Hellat |
| 5,426,412 A | 6/1995 | Tomonari et al. |

(Continued)

FOREIGN PATENT DOCUMENTS

| DE | 69329708 | 5/2001 |
| EP | 0122526 | 10/1984 |

(Continued)

OTHER PUBLICATIONS

Japanese Office action corresponding to application No. 2015-556964, dated Jul. 14, 2015.

(Continued)

*Primary Examiner* — David Porta
*Assistant Examiner* — Hugh H Maupin
(74) *Attorney, Agent, or Firm* — Reising Ethington P.C.

(57) ABSTRACT

Thermopile infrared sensor structure with a high filling level in a housing filled with a medium (15), consisting of a carrier substrate (11) which has electrical connections (28, 28') to the outside and is closed with an optical assembly (13), wherein a sensor chip (14) is applied to the carrier substrate (11) in the housing, which chip has a plurality of thermoelectric sensor element structures (16), the so-called "hot contacts" (10) of which are located on individual diaphragms (3) which are stretched across a respective cavity (9) in a silicon carrying body (24) with good thermal conductivity, wherein the "cold contacts" (25) are located on (Continued)

or in the vicinity of the silicon carrying body (24). The problem addressed by the invention is that of specifying a thermopile infrared array sensor (sensor cell) which, with a small chip size, has a high thermal resolution and a particularly high filling level. This sensor is preferably intended to be operated in gas with a normal pressure or a reduced pressure and is intended to be able to be mass-produced in a cost-effective manner under ultra-high vacuum without complicated technologies for closing the housing. This is achieved by virtue of the fact that a radiation collector structure (17) is located above each individual diaphragm (3) of the sensor element structures (16) which spans a cavity (9).

23 Claims, 11 Drawing Sheets

(51) Int. Cl.
*G01J 5/02* (2006.01)
*G01J 5/06* (2006.01)

(56) References Cited

U.S. PATENT DOCUMENTS

| | | | |
|---|---|---|---|
| 6,163,061 A * | 12/2000 | Iida | G01J 5/20 257/414 |
| 6,552,344 B1 * | 4/2003 | Sone et al. | 250/338.1 |
| 7,728,297 B2 | 6/2010 | Masafumi | |
| 7,842,922 B2 | 11/2010 | Leneke et al. | |
| 8,592,765 B2 | 11/2013 | Forg et al. | |
| 2003/0054179 A1 | 3/2003 | Nakajima et al. | |
| 2003/0201395 A1 | 10/2003 | Yon et al. | |
| 2004/0200962 A1 | 10/2004 | Ishikawa et al. | |
| 2005/0178967 A1 | 8/2005 | Nakaki et al. | |
| 2008/0216883 A1 * | 9/2008 | Leneke et al. | 136/224 |
| 2009/0140147 A1 | 6/2009 | Skidmore et al. | |
| 2011/0174978 A1 | 7/2011 | Forg et al. | |

FOREIGN PATENT DOCUMENTS

| | | |
|---|---|---|
| EP | 0599364 | 6/1994 |
| EP | 2034285 | 3/2009 |
| EP | 2348294 | 7/2011 |
| JP | 2001074549 A | 3/2001 |
| JP | 2001156277 A | 6/2001 |
| JP | 2003344157 A | 12/2003 |
| JP | 2004239708 A | 8/2004 |
| JP | 2004340719 A | 12/2004 |
| JP | 2008002912 A | 1/2008 |
| JP | 2010210293 A | 9/2010 |
| JP | 2011027650 | 2/2011 |
| JP | 2011145296 A | 7/2011 |
| WO | WO2006122529 | 11/2006 |

OTHER PUBLICATIONS

International Search Report for PCT/EP2013/050881, dated May 31, 2013, 3 pages.
Wu, H., et al., "A Surface Micromachined Thermopile Detector Array with an Interference-Based Absorber", Journal of Micromechanics and Microengineering 21(2011) 074009, 8 pages.
Author unknown, "Measurement System", retrieved from http://www.int.tech-jam.com/i2/measurement.phtml, Tech-Jam International, dated Sep. 26, 2002, 3 pages.
Kanno, Toshio, et al. "Uncooled Infrared Focal Plane Array Having 128×128 Thermopile Detector Elements", 450/SPIE 2269 Infrared Technology XX (1994), 10 pages.
English summary of Japanese Office action corresponding to JP application No. 2014-556964, dated Dec. 1, 2015, 2 pages.
English translation of Japanese Office action corresponding to JP application No. 2014-556964, dated Dec. 1, 2015, 2 pages.
Korean Office Action, in Korean with English translation, corresponding to KR application No. 10-2014-7025845, dated Mar. 31, 2016, 15 pages.
Chinese Office Action, in Chinese with English translation, corresponding to CN application No. 201380020314.1, dated Apr. 29, 2016, 18 pages.
Chinese Office Action in Chinese with English translation for CN application No. 201380020314.1, dated Jan. 12, 2017, 16 pages.

\* cited by examiner

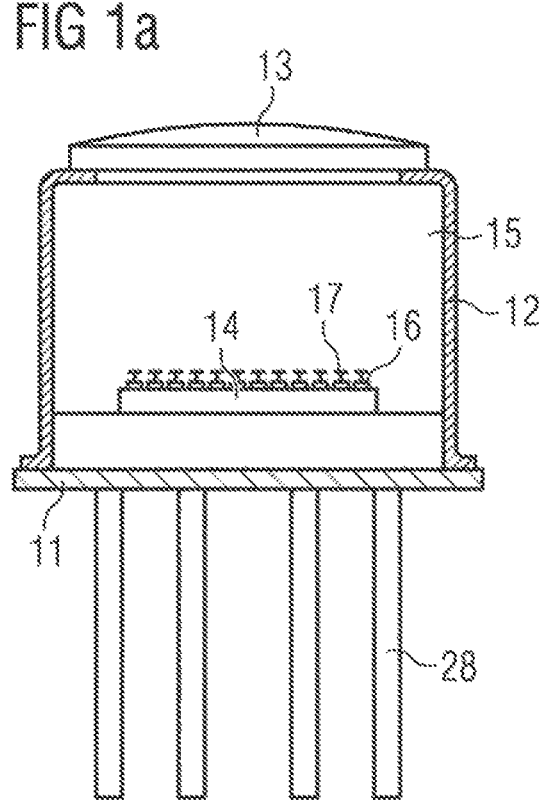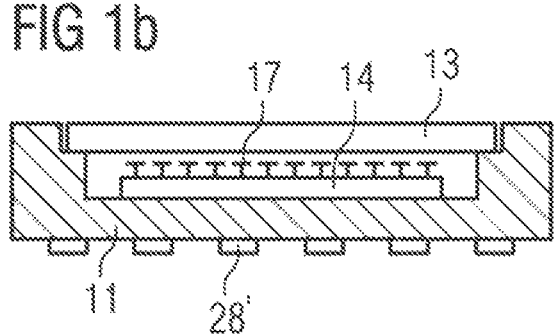

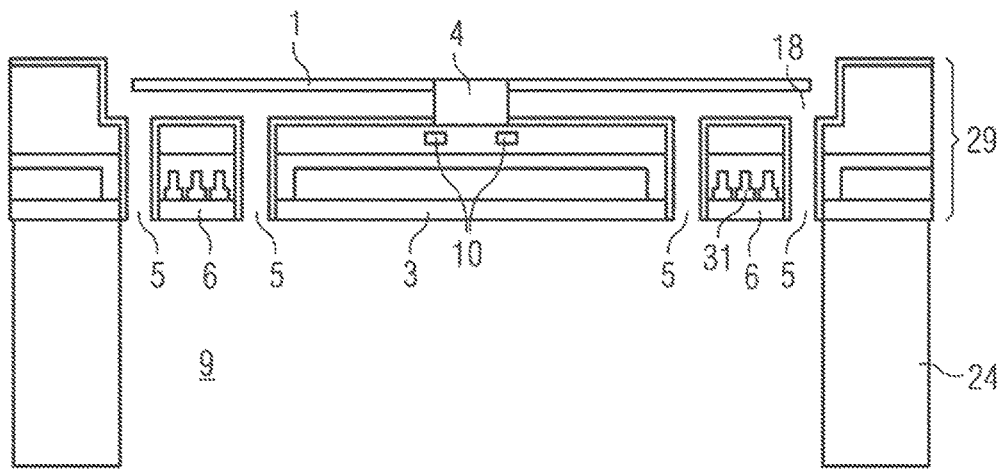
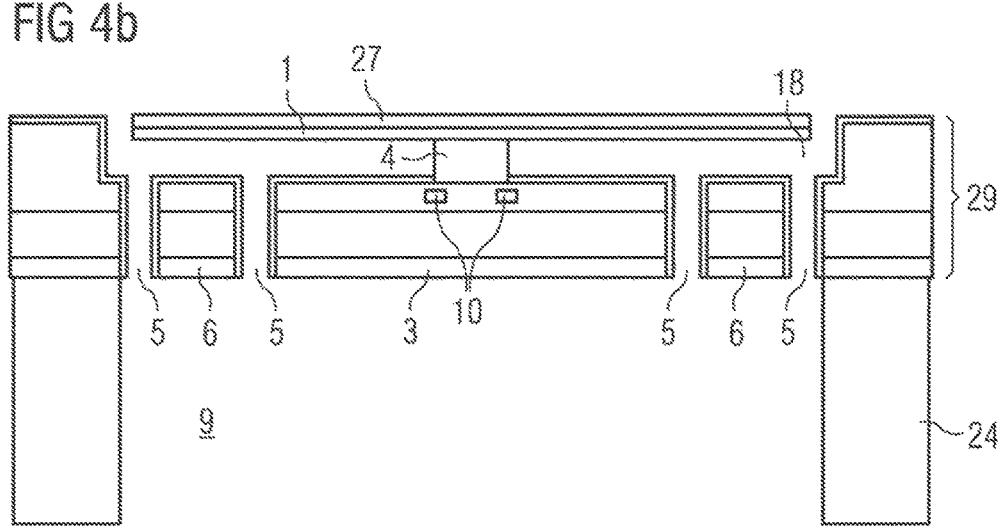

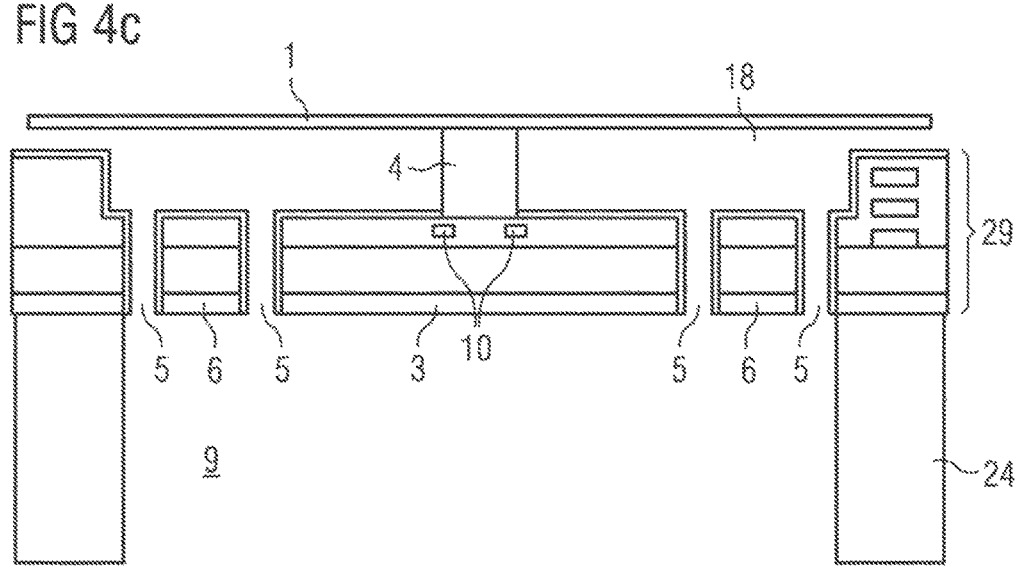
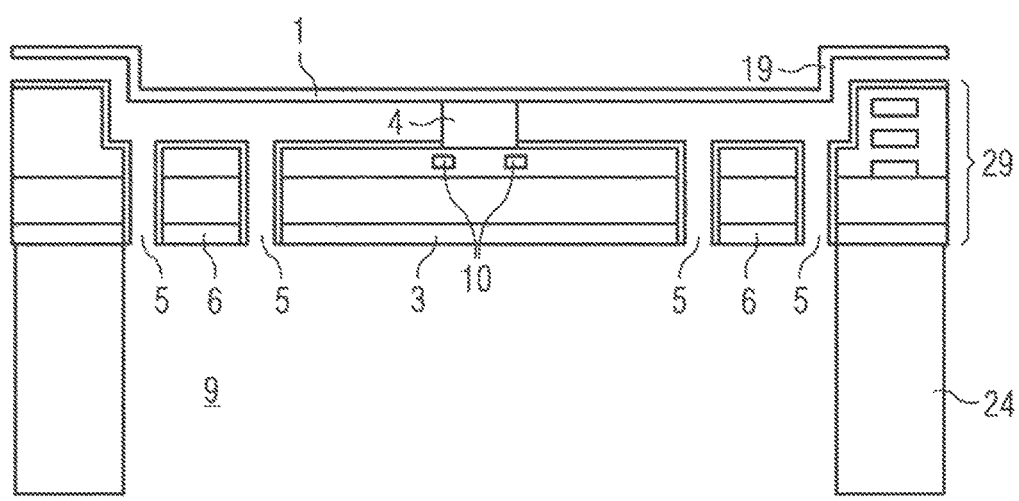

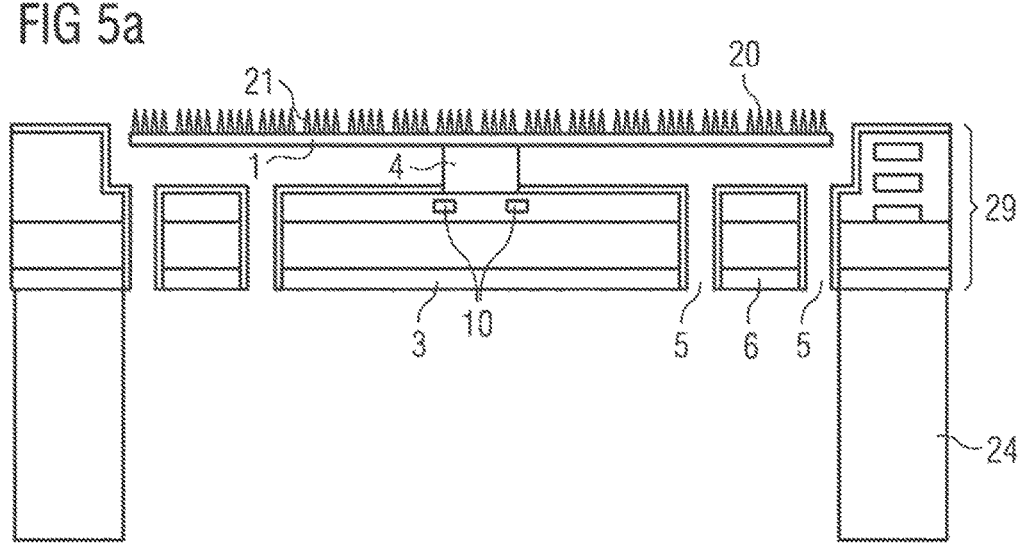
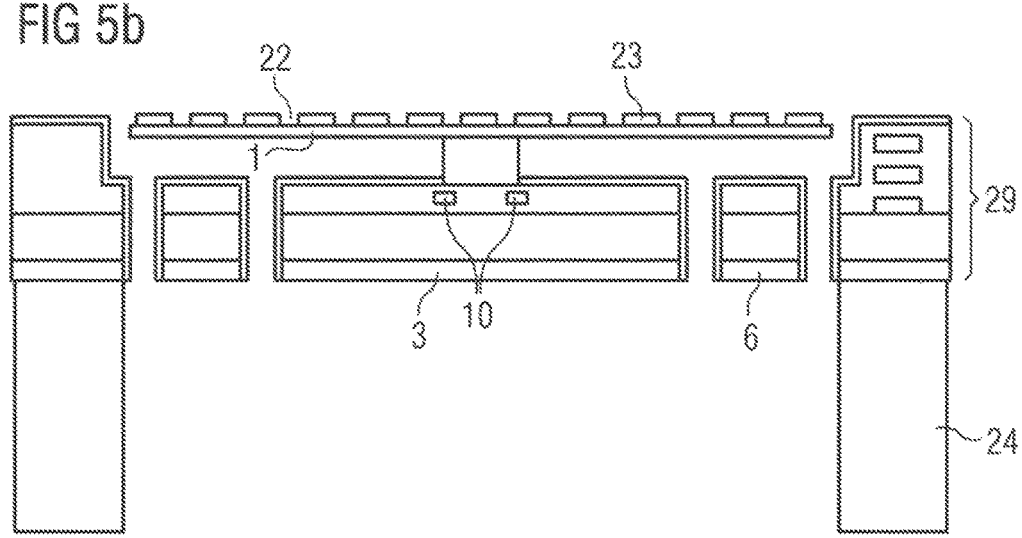

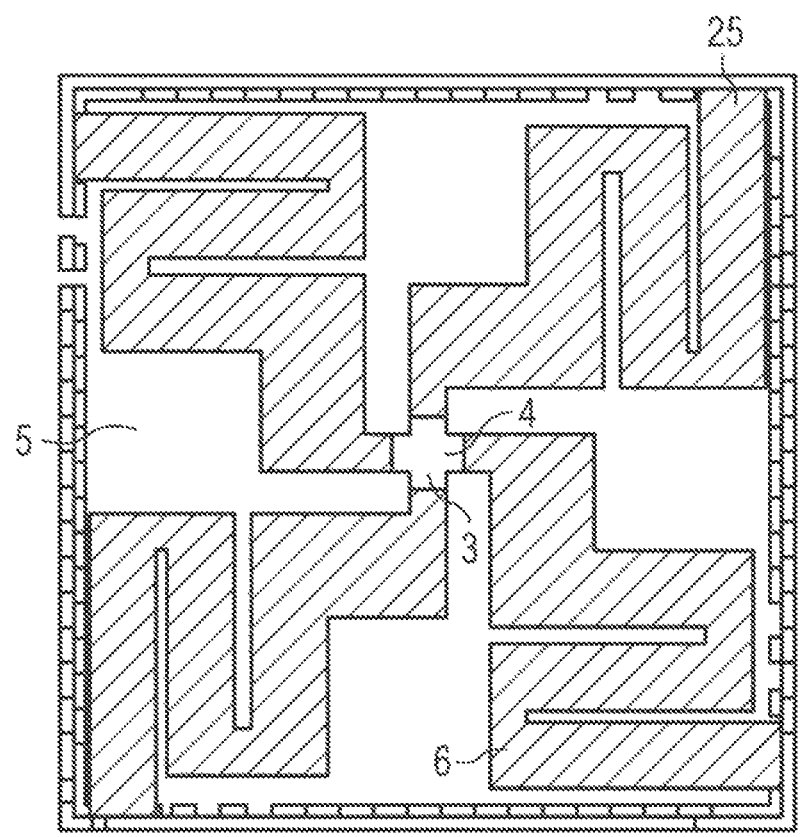

THERMOPILE INFRARED SENSOR STRUCTURE WITH A HIGH FILLING LEVEL

TECHNICAL FIELD

The invention relates to a thermopile infrared sensor structure with a high filling level in a housing filled with a medium, consisting of a baseplate, which has electrical connections to the outside and which is closed with an optical assembly, and wherein a sensor chip is applied on the baseplate in the housing, said chip carrying a plurality of thermoelectric sensor element structures, the so-called "hot contacts" of which are situated on individual membranes stretched across a respective cavity in a silicon carrying body having good thermal conductivity, wherein the "cold contacts" are situated on or in the vicinity of the silicon carrying body.

BACKGROUND

Infrared thermopile sensor arrays are known which can be produced in different varieties using silicon micromachining technology. In this case, a thin membrane with thermoelements arranged thereon using thin-film technology is usually situated in the center of each sensor cell. Said membrane is situated above a cavity in the underlying silicon substrate.

The thermoelements have so-called "hot" and "cold" contacts, wherein the "hot" contacts are situated on the central part of the membrane, the absorber region, while the "cold" contacts are positioned on the edge of the silicon substrate (pixel). The central part of the membrane containing the absorber and the edge of the silicon substrate serving as a heat sink are connected to one another via thin webs (beams).

The absorption of infrared radiation for the most part takes place in the central region of the membrane. Said region is (in particular in high density arrays) significantly smaller than the size of the pixel.

This has two major disadvantages, since part of the infrared radiation (IR radiation) to the pixel is not used, as a result of which the achievable resolution is reduced.

Secondly, small hot spots (objects or persons to be detected or to be measured), the image of which is incident through the optical system on the edge region of the pixel outside the central region, do not make a sufficient signal contribution and are "overlooked".

A description is given below of such a solution for a thermopile array from the prior art with reference to EP 2 348 294 or US 2003/0054179 A1. This involves a thermal IR sensor in a housing with a radiation entrance optical system and a chip with thermoelements on a central thin membrane, which is stretched above a frame-shaped carrying body having a good thermal conductivity. What is disadvantageous here is that the absorbent central region is significantly smaller than the total area of a pixel. A multilayer radiation detector layer, which can be constructed by means of conventional processes of circuit production, is situated on the membrane. One major disadvantage here is that only 70% absorption is possible on account of the multilayer structure of a semiconductor circuit stack.

The carrier substrate is hollowed out below the sensor structure, which is achieved by means of a wet-chemical etching method (surface micromachining), oblique walls being produced.

If the thermal sensor is not operated under high vacuum, then the heat conduction of the residual gas or of the filling gas in the sensor housing reduces the achievable temperature difference between the "hot contacts" on the absorber region and the "cold contacts" on the heat sink (carrier substrate).

If the absorbed IR radiation produces a smaller temperature difference, the achievable sensitivity of the sensor cell also decreases.

Kanno, T. et al. (NEC Corp.): "Uncooled focal plane array having 128×128 thermopile detector elements" in B. Andersen (Ed.), Infrared Technology, Proc. SPIE 2269, Vol. XX, San Diego, July 1994, pages 450-459, specify a monolithic thermopile sensor array in which the sensor elements are produced using a surface micromachining technology with a sacrificial layer.

Once again the central part with the absorber layer is significantly smaller than the size of the pixel. The distance between sensor structure and heat sink is significantly smaller than the substrate thickness itself. The solution allows a relatively good resolution only for the case where the sensor chip is encapsulated in the high-vacuum-tight housing. With cost-effective housing constructions under low residual gas pressure, or with a filling gas, sufficiently high sensitivities cannot be achieved.

DE 693 29 708 T2 or EP 0 599 364 B1 is concerned with a production method for infrared radiation sensors in which the sensitivity is improved by the use of a vacuum housing or a housing filled with a gas having only slight thermal conductivity.

The radiation sensor has wet-etched, oblique etching pit walls. Between baseplate and substrate there is a ventilation gap that preferably serves for pressure equalization between the region above and below the membrane. The absorber region here is likewise significantly smaller than the dimensioning of a pixel.

HORIBA product information: "8×8 element thermopile Imager"; in Tech Jam International, Sep. 26, 2002, specifies a monolithic thermopile sensor array produced using bulk Si micromachining technology. The 64 elements are situated on a chip having a size of 8×8 mm, each element being thermally separated by silicon walls using wet etching technology. The technologically dictated size of the chip leads to relatively high production costs and is once again an obstacle to cost-effective mass-produced applications.

In both the aforementioned solutions, the filling factor is particularly poor.

Besides these thermopile solutions there are further solutions in relation to low-cost infrared arrays.

"A surface micromachined thermopile detector array with an interference-based absorber", J. Micromech. Microeng. 21 (2011) 8 pp describes a thermopile detector array using surface silicon micromachining. Besides the production of a thermopile, said publication is primarily concerned with a CMOS-compatible interference-based absorber consisting of four layers lying one above another (SiC/Ti/SiC/Al). This layer stack ostensibly absorbs wavelengths in the range of 1-5 µm. However, these wavelengths are not very useful for applications appertaining to person or object detection. Furthermore, problems in the production process are described. Inter alia, residues occur during the removal of the silicon nitride layer and can form a non-transparent film and, in the worst case, can lead to the destruction of the structure.

Skidmore et al.: "Pixel Structure having an umbrella type absorber with one or more recesses or channels sized to increase radiation absorption" US 2009/014017 A1 describe a pixel structure having a so-called umbrella-type absorber. A pixel structure consisting of a bolometer and a substrate is described. The bolometer comprises a transducer having a plurality of holes or channels which are intended to increase the resistance and the absorption. The recesses or channels furthermore have the effect that those parts of the infrared radiation which would otherwise be reflected are directed into the absorber. Said recess also reduces the thermal mass of the bolometer. As a result, however, more process steps are required and the production process becomes more expensive.

The umbrella-type absorber is situated above a bolometer. On account of the construction of said bolometer, however, a vacuum packaging is necessary; in addition, bolometers generally require a temperature stabilization or a shutter or other complicated correction methods in order to compensate for the great drift of the sensitive material.

The vacuum packaging is complicated and expensive above all for reliable applications. The transducer can consist of vanadium oxide (VOx), titanium oxide (TiOx), amorphous silicon or other materials having a good temperature-resistance behavior.

None of these structures described allows the construction of cost-effective thermopile arrays with a high filling level which manage without vacuum.

In all the thermopile infrared array sensor cells described, the absorber area is small in comparison with the pixel area. That limits the maximum achievable signal portion per pixel and increases the risk of incorrect measurements.

The signal voltage of a thermopile pixel can be increased, inter alia, by a plurality of series-connected thermopairs being structured on the pixel. In order to make use of low manufacturing costs, a standard CMOS process in which the thermoelements lie alongside one another has to be used. If the number of thermoelements on the beam is increased, then inevitably the beam is widened—and at the same time the central region with the absorber area becomes even smaller, however, which in turn reduces the quantity of absorbed infrared radiation energy per pixel and thus impairs the filling level even further.

SUMMARY

It is an object of the invention to specify a thermopile infrared array sensor (sensor cell) which has a high thermal resolution and a particularly high filling level in conjunction with a small chip size. This sensor is intended preferably to be operated under gas at normal pressure or reduced pressure and is intended to be producible cost-effectively in mass-produced numbers without complicated technologies for housing closure under ultrahigh vacuum.

The invention relates to an infrared (silicon) chip which is produced using silicon micromachining and has a collector-like IR absorber (called radiation collector hereinafter) situated in a second plane above a membrane. A particularly high filling level is achieved as a result.

This infrared chip is a thermopile sensor, but other types of infrared sensor, such as pyrosensors, are also possible.

The central part of the membrane, on which the hot contacts are arranged, is connected to the silicon wall by connecting webs.

The sides of the connecting webs are separated from the central part of the membrane and from the silicon carrying body by slots. The thermal resistance between the central part of the membrane, the connecting webs and the silicon carrying body is increased as a result. Thermoelements are situated on said connecting webs and connect the hot and cold contacts to one another.

According to the invention, a radiation collector construction is constructed on at least one heat conducting foot or prop above each individual membrane, which mechanically holds the radiation collector. The membrane spans a cavity in the silicon carrying body. A plurality of props and a plurality of radiation collectors in different forms and types of construction are also possible. The prop or props exist in order to carry the radiation collector and in order to ensure heat transfer from the radiation collector to the underlying membrane with hot contacts.

The cavities are driven in from the front side or from the rear side of the silicon carrying body, and in the latter case are preferably provided with perpendicular or almost perpendicular sidewalls. In principle, arrangements having oblique substrate walls are also possible, although impairments of the achievable sensitivity are then accepted.

Furthermore, the membranes or the cavities have a square, rectangular, polygonal or round form. In a continuation of the invention, the radiation collector construction consists of one or more radiation collectors and one or more props which carry the latter and which thermally connect the radiation collector area to the underlying central part of the membrane and the "hot contacts". Preferably, the radiation collector(s) and the prop(s) consist of the same material and are produced in the same process, as a result of which the production costs are very low.

In a further particular configuration of the invention, one or more thin connecting webs are arranged between adjacent radiation collectors or the radiation collector constructions, and increase the mechanical stability of the radiation collectors or of the radiation collector construction. However, care should be taken to ensure that the connecting webs do not give rise to appreciable temperature equalization between adjacent radiation collectors, which would result in thermal crosstalk and hence corruption of the radiation detection.

In this case, the form of the props varies with the type of collector. The prop can have the form of a cylinder, on account of a sacrificial layer technology used. Other geometrical, parallelepipedal and round forms or tubular cross sections are also possible. One possible type of construction is circular, wherein the props are situated on a circular path below the radiation collector and support it. It is also possible for the props in an elliptical, rectangular, parallelogram-shaped or trapezoidal geometrical form to be situated below the radiation collector.

The width of the props must guarantee a secure support for mechanical stability. On account of the mechanical fragility of the overall three-dimensional formation and achieving as little heat flow as possible via the surrounding region, a sufficiently large distance between the radiation collector and the surrounding topology must be ensured in order to avoid any risk of contact. This distance between collector area and underlying membrane can also be varied if the medium (gas) is at a very low pressure (vacuum), although that greatly increases the costs of the housing closure.

There can also be a plurality of props and radiation collectors in a geometrical form and type of construction for increasing firstly the mechanical stability and secondly also the heat flow from the radiation collector toward the hot contacts.

The number of props and radiation collectors can be varied in order to be able to ensure a maximum mechanical stability and the maximum heat flow to the hot contacts.

The thickness of the prop can be embodied with varying thicknesses, e.g. also in order to ensure a sufficient distance from adjacent topology in order that no heat exchange through contact or via a gas can take place.

The membranes are connected to the silicon carrying body in each case via narrow and thin webs, wherein the thermoelements with the functional layers are led over the webs and connect the "hot contacts" on the central region of the membrane to "cold contacts" on the silicon carrying body.

The central part of the membrane, which is thus suspended from at least one beam (web), is produced e.g. by etching. For this purpose, a pit (cavity) is driven in by etching from the rear side of the silicon carrying body in order to expose the membrane on the front side. In this case, both wet and plasma etching processes can be employed. On account of the perpendicular or almost perpendicular walls that can be achieved, the plasma etching process enables a significantly higher integration density than wet etching processes, which result in oblique walls.

Preferably two or more polysilicon layers lying one above another, which arise during the CMOS process, are situated on the connecting webs. These polysilicon layers were structured in order to produce thermoelements in the CMOS process. Fewer than 20, preferably fewer than 10, thermoelements are situated on each of the connecting webs, in order to reduce the heat conduction of the beams and to generate the highest possible signal. The number of thermoelements is upwardly limited by the minimum size of the central part of the membrane. Said central part must be at least large enough to accommodate the hot contacts and the props for fixing the radiation collector.

One of the two layers is n-conducting, and the other p-conducting. The connecting webs are arranged around the central part of the membrane, the webs being thermally decoupled by means of slots. One possible form of the beams is meanderlike; the signal is significantly increased thereby. A further advantage of this version is the reduction of stress in the overall construction. A disadvantage is an increase in the electrical resistance as a result of many and long double polys, which increases the thermal noise (Johnson noise). However, that is opposed by a gas having low thermal conductivity, which has a lower thermal conductivity than nitrogen/air. The heat conduction from the absorber region via the meandering slots or from the radiation collector toward the heat sink silicon is increasingly minimized by a gas having lower thermal conductivity.

In a continuation of the invention, the radiation collectors are of approximately the size of the underlying cavity in the silicon carrying body.

The radiation collectors can also extend over the edge of the cavity.

One particular configuration of the invention is characterized in that the radiation collectors have a step or protuberance in the edge region or/and the underlying layers have an introduced pit in the edge region above the silicon carrying body.

Alternatively, the radiation collectors can also be thinned in the edge region.

The radiation collector is distinguished by a high thermal conductivity and a low heat capacity. Furthermore, the radiation collector must have a low reflectivity in the direction of the incident radiation. This prevents the situation where the incident IR radiation is reflected at the surface of the collector and therefore cannot penetrate into the sensor. One possible approach consists in the use of materials having a columnar structure.

This absorbed heat is then transported via the collector and the prop to the hot contacts on the membrane.

The radiation collector can also be a multilayer system composed of mechanically stable layers, which need not necessarily be highly absorbent. In order to increase the mechanical stability, the radiation collector can be constructed from at least two different materials. In order to increase its absorption, the radiation collector as a multilayer system contains one or more additional layers that absorb infrared well. This multilayer system should be mechanically stress-compensated in order to prevent great bending and hence a mechanical contact with the membrane.

For absorbing infrared radiation that is transmitted and that is reflected back from below, the radiation collector can comprise a highly absorbent layer on the underside.

The radiation collector can also be covered with a thin absorber layer.

Furthermore, the radiation collector can be provided with alloys having a good thermal conductivity, in order to increase the heat flow toward the hot contacts.

The radiation collectors can also have a structured surface having pointed formations for increasing the absorber area and free regions therebetween for reducing the time constant.

A further possibility is a honeycomb-shaped multilayer construction of the radiation collector with reflective walls and an infrared-absorbing layer on the bottom of the honeycombs. Thermal radiation which is not incident perpendicularly and is reflected downward at the lateral walls can thus additionally be captured.

The distance between the radiation collector and adjacent topology must satisfy the circumstances of high temperature-stress loading insofar as even in the case of expansion and/or deformation of the radiation collector owing to thermal loading, contact with the surrounding topology is not permitted to arise under any circumstances. In order to increase the stability of the construction, these distances can become significantly larger. The larger distance also reduces the gas exchange between the outer edge of the radiation collector and the Si edge region.

The radiation collector with prop(s) can be exposed by means of release processes known per se in silicon micromachining. The radiation collector does not necessarily consist of CMOS-compatible materials. An infrared radiation-absorbing material which absorbs thermal radiation, in the case of transmission through the radiation collector, can be situated on the underlying membrane. Even a not very highly absorbent material on the central area of the membrane is possible, whereby part of the infrared radiation is reflected back again. The radiation is then absorbed on the underside of or within the radiation collector.

The radiation collector can be incorporated into a pit driven into the CMOS layers by means of suitable micromechanical removal processes.

The radiation collector integrated into the pit can then be at least as wide as the underlying central part of the membrane. Ideally, the size of the IR radiation collector is maximally the same as that of a pixel and the required distance from the pit edges is ideally intended to be fashioned such that the least possible parasitic heat flow from the IR collector to the heat sinks takes place.

The radiation collector can be situated above the membrane and additionally above the surrounding silicon sink (silicon carrying body 24). The maximum size of the collector is then determined by the minimum distance from the collectors of adjacent pixels, in order to avoid a heat flow between the collectors.

A plurality of collectors are situated in this case as an array alongside one another, in a manner spanning the pixels and inter-pixel electronics, in a manner delimited by narrow slots. In the production process, said narrow slots also serve, for example, for removing a sacrificial layer and for thermally separating the radiation collectors from one another.

The thickness of the membrane is determined by the number of interlayer dielectrics used in the CMOS process and the degree of micromechanical thinning. If the membrane is too thick, the heat capacity and time constant increase and the signal becomes smaller. However, a very thin membrane leads in turn to the instability of the overall formation and requires particularly good management of the technology and a low stress in the membrane layers.

In one embodiment for small numbers of elements, the individual sensor cells (pixels) of the array can be electrically connected to one another via the cold contacts as an array by means of metal conductive tracks. The electronic data processing is situated largely outside the sensor array zone around the array chip.

In one particularly preferred form, a large part of the electronic data processing is situated between the pixels. In order that the area for electronics between pixels can be kept as small as possible and the radiation collector size can be kept large, it is possible for e.g. two or more cells to share an electronic data processing.

In the case of the thermopile sensor array according to the invention, the absorbed thermal radiation is not ostensibly directed downward, in contrast to the prior art; rather, the absorption is intended preferably to arise in the radiation collector. The absorbed heat can be conducted via a heat conducting foot or prop to the underlying central part of the membrane with hot contacts.

BRIEF DESCRIPTION OF THE DRAWINGS

The invention is described in greater detail below on the basis of exemplary embodiments. In the associated drawings:

FIG. 1a shows the basic construction of a thermopile sensor array according to the invention in a housing closed with a cap;

FIG. 1b shows the basic construction of a thermopile sensor array according to the invention with a filter as entrance optical system and closure;

FIGS. 4a . . . d show cross sections through thermopile array sensor cells according to the invention with different embodiments for the mounting of the radiation collector. The construction technique of radiation collector above props on the membrane becomes clear in these figures;

FIGS. 5a, b show the cross section through a thermopile array sensor cell according to the invention with different embodiments for the absorbent layer on the radiation collector.

Figure 2A:
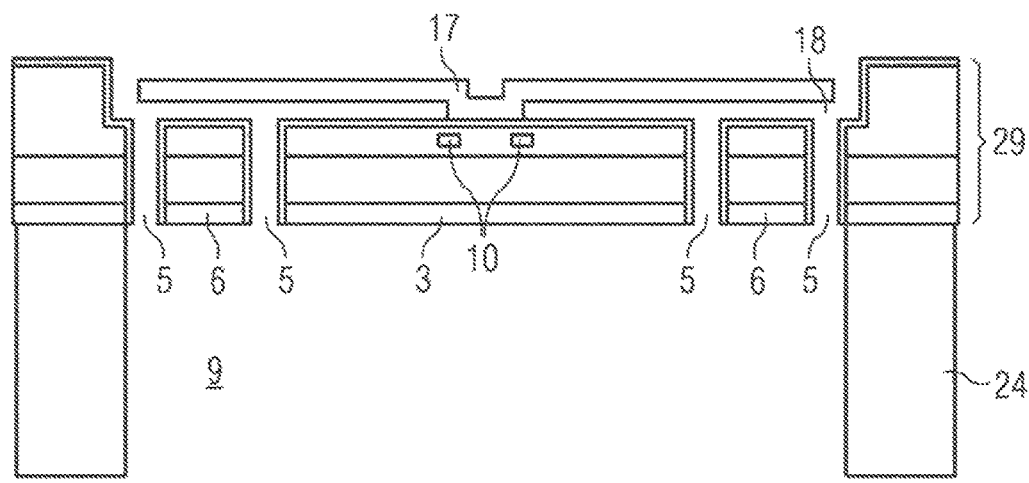
FIG. 2a shows a cross section of a sensor cell of the sensor array chip with radiation collector construction.

DETAILED DESCRIPTION OF THE
ILLUSTRATED EMBODIMENT(S)

FIG. 1a shows the basic construction of an infrared sensor array according to the invention.

The thermopile sensor array chip 14 is applied centrally on a carrier substrate (e.g. baseplate) 11. The arrangement is closed with an optical assembly in the form of a cap 12, which contains an opening for an entrance optical system 13 arranged exactly above the center of the sensor elements of the thermopile sensor array chip 14. Optionally, the optical assembly in the form of a cap 12 in accordance with FIG. 1a can be replaced by a filter as the entrance optical system 13 in accordance with FIG. 1b, thus giving rise to the structure of a flat SMD component.

The thermopile sensor array chip 14 contains a plurality of thermoelectric sensor elements 16, which are arranged e.g. in the form of a line or an array on the chip. Radiation collector constructions 17 are assigned to the individual sensor elements 16, wherein preferably each sensor element 16 contains a radiation collector construction 17.

The entrance optical system 13 can be in one instance a plane-parallel filter (FIG. 1b) or a lens optical system (FIG. 1a). In the case of the variant illustrated in FIG. 1a, an imaging lens 13 is illustrated as the entrance optical system. The dimensions of cap 12, thermopile sensor array chip 14 with the radiation collectors 1 and the focal length of the entrance optical system 13 are chosen such that the objects to be imaged are imaged sharply on the sensor elements 16 via the entrance optical system 13. A variant with filter is illustrated in FIG. 1b; in this case, at least one lens or some other imaging optical element (e.g. a mirror optical system) has to be mounted outside the housing.

Contact elements 28' or plug connectors 28 are usually arranged on the carrier substrate 11 in order to forward the output signals of the thermopile sensor array chip 14 to other assemblies. The thermopile sensor array chip 14 is connected to the baseplate 11 via a contact means having a very high thermal conductivity (not illustrated). Said contact means can be e.g. an adhesive filled with metal or ceramic, a metal-filled glazing, or a solder.

A medium in the form of a gas or gas mixture 15 is enclosed below the cap 12, wherein the cap 12 must be closed with the baseplate 11 tightly enough that gas exchange with the environment outside the cap 12 cannot take place.

The gas or gas mixture 15 is intended to have a thermal conductivity that is lower than that of air or nitrogen, in order to minimize the convection from the sensitive elements on the sensor array chip 14 or the radiation collector layer of the radiation collectors 1 to the silicon carrying body 24 (FIG. 2a) or the housing (cap 12), which function as a heat sink.

In order to achieve this low heat conduction of the gas or gas mixture 15 enclosed in the housing, an internal pressure greatly reduced relative to normal air pressure is generated (e.g. a gas vacuum).

For cost reasons, for the gas or gas mixture 15 use is preferably made of a gas having a high molar mass (e.g. xenon, krypton or argon) under normal atmospheric pressure because then the long-term stability of the housing sealing can be achieved significantly more simply with lower outlay than in the case of a gas vacuum or a gas mixture at very low pressure.

The construction of the sensor array chip 14 with the IR radiation collector construction 17 according to the invention is shown in FIGS. 2a . . . e.

FIG. 2a shows a cross section of a sensor cell of the thermopile sensor array chip 14 with radiation collector construction 17. The thermopile sensor array chip 14 consists of a frame-shaped silicon carrying body 24, which has been worked from a silicon substrate, with a cavity 9 spanned by a membrane 3. The membrane 3 is connected to the silicon carrying body 24 via narrow webs 6. A CMOS layer construction 29 is situated on the membrane 3 and the silicon carrying body 24 and has above the membrane 3 a pit 18 driven in from above.

In the pit 18, the radiation collector construction 17 is situated above the membrane 3 (see FIG. 1), the radiation collector construction, in the particularly preferred construction, consisting of a material that is produced in a single process. As a result, the production costs are reduced and the mechanical stress in the layers is minimized.

Standard methods of micromachining are used to produce the radiation collector construction 17. Said methods can be e.g. processes known per se such as sacrificial layer technique, lift-off and other etching methods. This construction furthermore allows additional absorbent, also thermally conductive layers to be applied on the radiation collector construction 17 (see e.g. FIG. 4b).

Around the radiation collector construction 17, around the membrane 3, in the slots 5, in the cavity 9 and in the pit 18 there is situated a gas or gas mixture 15 for thermally decoupling the elements from one another and with respect to the silicon carrying body 24, which serves as a heat sink. Situated around the central part of the membrane 3 are the connecting webs 6 with thermoelements, which concomitantly arise directly during the CMOS process (silicon wafer processing) in order to achieve low production costs. Said thermoelements operate according to the Seebeck effect (thermoelectric effect) and can consist e.g. of silicon or germanium or some other semiconductor and of metal layers having a high Seebeck coefficient (e.g. Bi, Sb or other alloys).

Preferably, n-doped and p-doped polycrystalline silicon is used because this can be produced simply and cost-effectively in a standard CMOS process. The construction of thermopile structures with the hot contacts on insulated membranes and the cold contacts on or above the silicon heat sink, the silicon carrying body 24, is known per se and will therefore not be described in detail here.

Figure 2B:
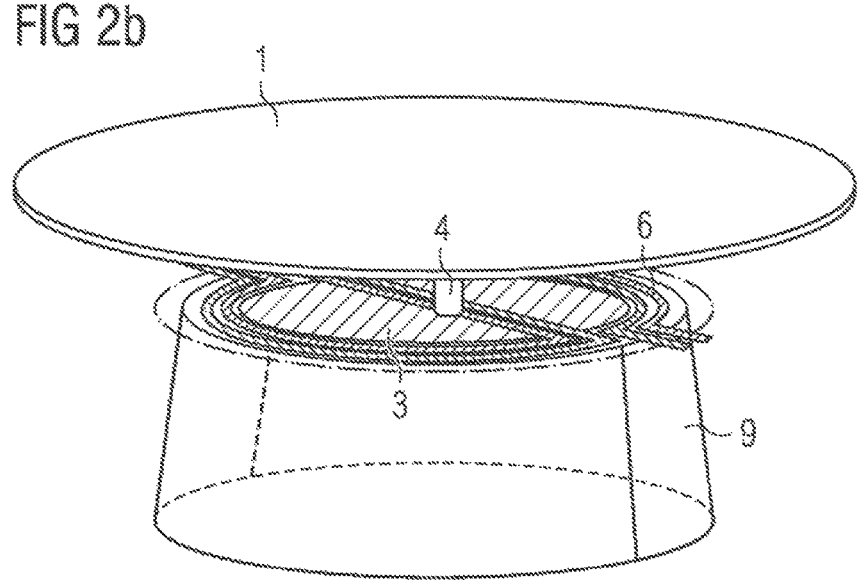
FIG. 2b shows a construction of a sensor cell of the sensor array chip with radiation collector construction, consisting of a prop and the radiation collector.

FIG. 2b shows the construction of a round sensor cell of the sensor array chip 14 with radiation collector construction 17, consisting of a prop 4 and the radiation collector 1 carried by the latter. The prop 4 is situated on the membrane 3.

The radiation collector construction 17 (see FIG. 1) can also consist of a plurality of elements with a plurality of radiation collectors 1 and a plurality of props 4. This design leads to a better adaptation to the requirement of the applications, to the achievement of smaller time constants and particularly high signals.

Figure 2C:
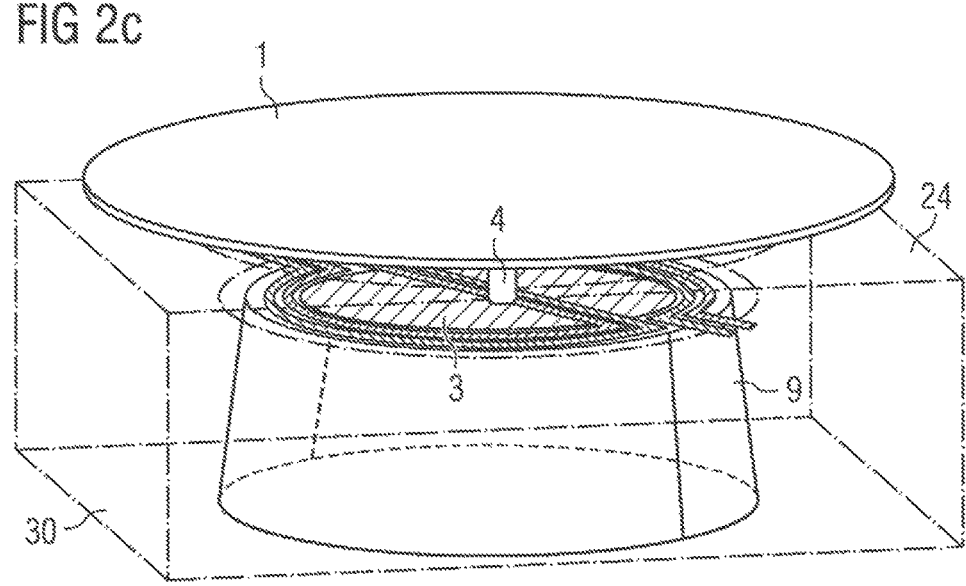
FIGS. 2c . . . e show the basic construction of a thermopile sensor cell according to the invention in a different geometrical form.

The prop 4 is embodied with a height such that, even with high thermal loading, a mechanical contact between the radiation collector 1 applied on said prop and the underlying central part of the membrane 3 or the silicon carrying body 24 with the CMOS layer construction 29 can never occur (also see FIG. 2c).

FIGS. 2c . . . e show the basic construction of a thermopile sensor cell according to the invention in a different geometrical form.

In FIG. 2c, the radiation collector 1 is mounted on a prop 4 on the membrane 3. It spans the central part of the membrane 3 and the cavity 9 and also the surrounding silicon carrying body 24. Metal conductive tracks and pixel read-out electronics can be situated on said silicon carrying body. The cavity 9 is driven into the silicon carrying body 24 of the sensor chip (e.g. silicon wafer from the CMOS process) as deeply as possible from below, in order that the heat conduction via the gas or gas mixture 15 between the membrane 3 or the sensitive layers and the cavity wall acting as a heat sink is as low as possible.

Said cavity 9 can be produced, for example, from the front side by the silicon being etched out isotropically or anisotropically through openings in the membrane. Alkaline etching solutions such as KOH or TMAH (tetramethylammonium hydroxide) having a high etching rate for silicon are usually used for this purpose. However, the silicon in the cavity 9 can also be extracted by other removal methods (e.g. laser technology and similar methods).

In this regard, the cavities 9 can have oblique walls (see FIG. 2e) or rounded walls—depending on etching direction and etchant.

Preferably the cavity 9 has perpendicular or almost perpendicular walls through the entire substrate because the lowest heat loss through the medium 15 and thus the highest signal sensitivity are then achieved. Such perpendicular walls can be implemented, for example, by means of so-called depth etching from the underside of the wafer (so-called dry etching method or DRIE). Thus, the pixel area is less than or equal to the absorber area and a high signal with at the same time a small sensor area is possible.

Figure 2D:
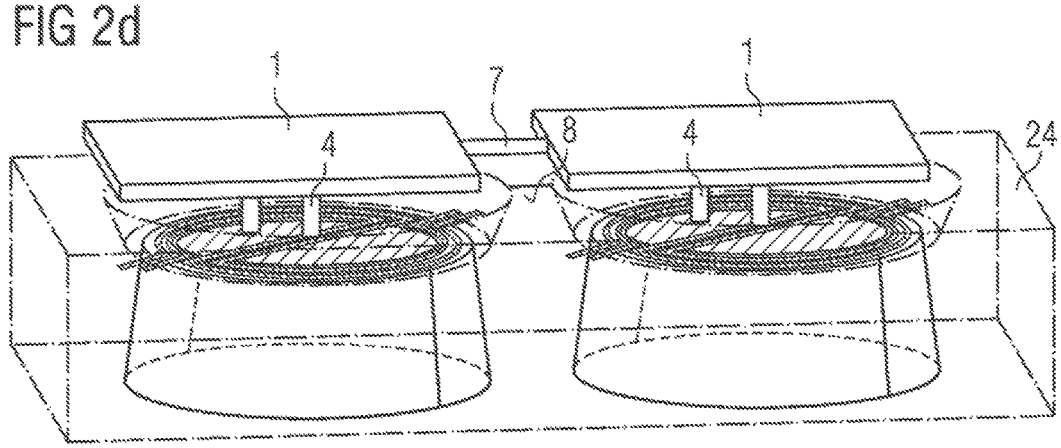

FIG. 2d shows an oblique view of two adjacent pixel structures of an array, wherein two adjacent radiation collectors 1 are connected to one another by means of mechanical connecting webs 7.

Both radiation collectors 1 have a square or rectangular form (depending on the desired pixel geometry) and are mounted on in each case two props 4 situated at a distance alongside one another. Situated between the radiation collectors 1 are thin mechanical connecting webs 7, e.g. in order to achieve a higher mechanical stability of the radiation collector constructions 17.

Said connecting webs 7 should preferably have a small cross section. The materials used should be chosen such that they combine a high mechanical strength with the lowest possible thermal conductivity.

There can also be a plurality of said webs, and the latter can stabilize the radiation collectors 1 also at the corners or also at the sides. Metal conductive tracks and electronics can be situated on the area 8 between the membranes 3. The membranes 3 can be round, as illustrated, rectangular, octagonal and square and can be similar to the form of the respective radiation collectors 1.

If the size of the radiation collector 1 is at least the same as that of the membrane 3, then that results in a larger proportion of the incident infrared radiation which is absorbed on the radiation collector 1. In addition, the size of the radiation collector 1 prevents the incident radiation from being able to impinge on the slots 5 and being lost, or from being reflected by the area 8 and thus leading to crosstalk as a result of multiple reflections in the housing.

An infrared-absorbing layer can be situated on the membrane 3. The radiation that is transmitted through the radiation collector 1 and that emerges from the radiation collector 1 perpendicularly or almost perpendicularly downward is thus additionally absorbed on this underlying absorber layer.

Figure 2E:
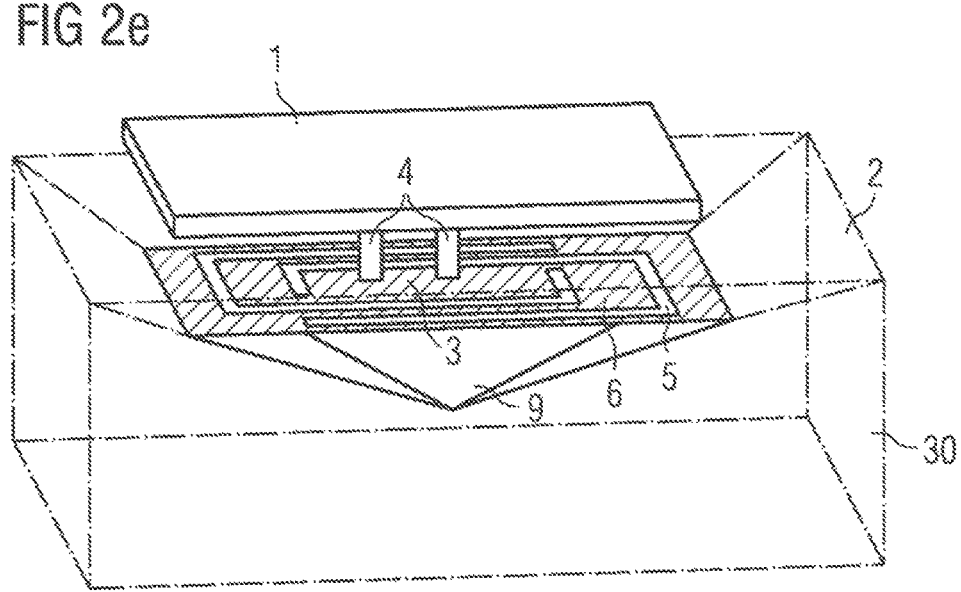

FIG. 2e shows a further configuration according to the invention of the sensor element having square or perpendicular element geometries and a cavity 9 driven into the substrate from the front side, produced in this case by means of anisotropic Si etching through openings in the membrane 3. Oblique walls of the cavity 9 arise in the case illustrated. The membrane 3 here is likewise carried by narrow connecting webs 6 which partly wrap around the membrane 3 and are separated in relation to the surrounding substrate 30 (heat sink) by narrow slots 5. The rectangular radiation collector 1 situated above the membrane 3 is held by two props 4 above the membrane 3. The radiation collector 1 is larger than the membrane 3 and also covers the connecting webs 6 and the slots 5. This avoids a situation in which infrared radiation might be lost through the slots 5.

FIG. 3 shows further details in the configuration of the cells of the infrared sensor with the thermopile sensor cell according to the invention having different geometries for the radiation collector 1 and the construction thereof on the membrane 3.

Figure 3A:
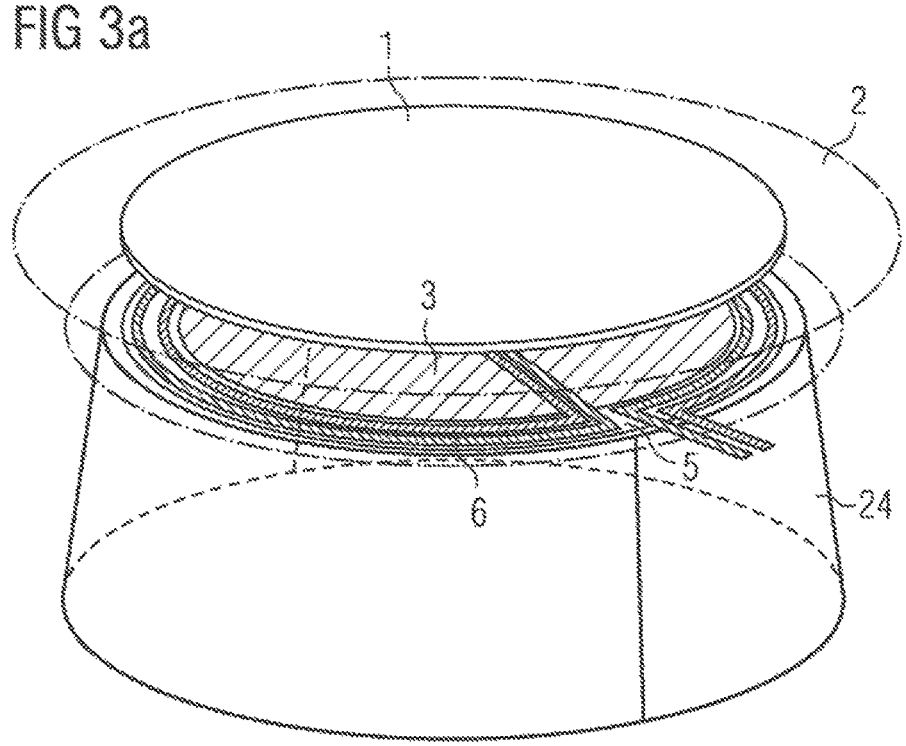
FIGS. 3a . . . b show further details in the configuration of the cells of the infrared sensor with the thermopile sensor cell according to the invention having different geometries for the radiation collector and the construction thereof on the membrane area.

FIG. 3*a* shows an excerpt from a cell of the thermopile sensor chip 14 according to the invention with connecting webs 6—thermally decoupled by slots 5—from the silicon carrying body 24 to the membrane 3.

The radiation collector 1 is fixed on the central part of the membrane 3 by means of a prop (not visible). The membrane 3 is coated with an infrared-absorbing layer. The thermoelements on the connecting webs 6 are separated from surrounding layers and the membrane 3 by means of slots 5. The cell construction has a round form in order to provide enough space for the edge electronics in the corners of the cell.

Figure 3B:
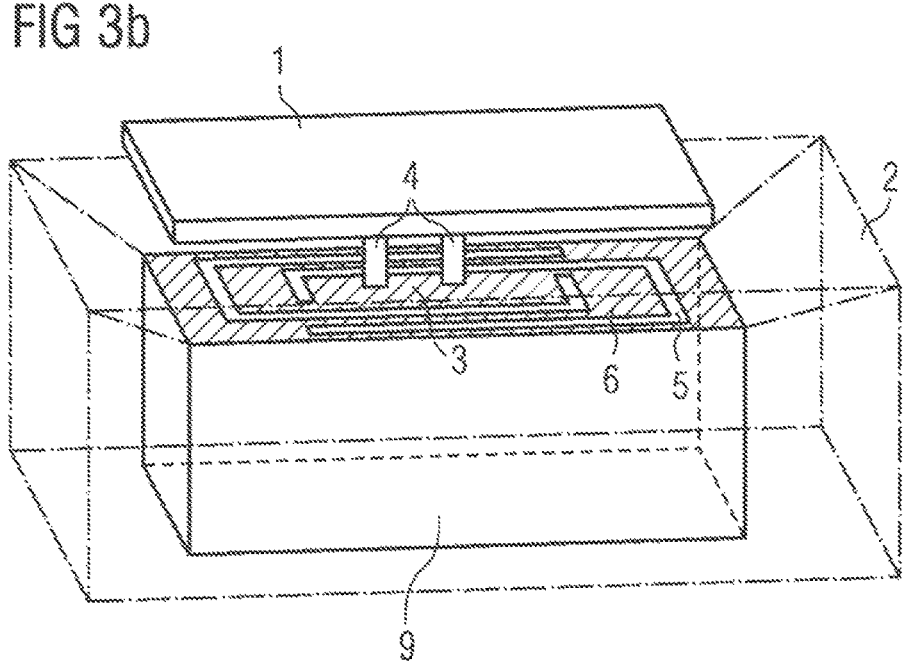

FIG. 3*b* illustrates the cell with a square basic structure.

The radiation collector 1 is fixed by means of two props 4 on a rectangular membrane 3. Thermoelements on the connecting webs 6 are separated from surrounding layers and the central part of the membrane by means of slots 5. The cell construction has a rectangular form. It should be noted that the cell geometry can also be hexagonal, octagonal or any other polygon or an ellipse, instead of round or square. A cavity 9 having perpendicular walls is situated below the recessed membrane 3.

FIGS. 4*a* . . . *d* show cross sections through thermopile array sensor cells according to the invention with different embodiments for the possible mounting of the radiation collector 1.

The construction technique of radiation collector 1 by way of prop 4 on the membrane 3 becomes clear in these illustrations.

FIG. 4*a* reveals a cross section of a cell according to the invention with mounting of the radiation collector 1 in a first embodiment.

FIG. 4*a* shows the cell construction comprising IR radiation collector 1 and prop 4 in a pit 18 driven in from above in the CMOS layer construction 29. The pit 9 driven into the silicon carrying body 24 from below has perpendicular or almost perpendicular walls, in order that the slots 5 and the connecting webs 6 are exposed. In the example in FIG. 4*a*, in each case three polysilicon conductive tracks 31 are situated on the connecting webs 6, wherein n- and p-type polysilicon conductive tracks are arranged one above another for the purpose of better area utilization and for expedient production costs.

It goes without saying that other arrangements, other dopings, other materials, a different number of polysilicon conductive tracks and a plurality of layers one above another are also possible.

The central part of the membrane 3 includes the hot contacts 10, which are ideally situated directly below the prop 4 or in the vicinity thereof. However, the hot contacts 10 can also be situated at other arbitrary locations on or in the membrane 3.

FIG. 4*b* illustrates the cross section of a further cell according to the invention with a multilayered radiation collector 1 with an additional absorber layer 27. Here, too, the radiation collector 1 is situated in a pit 18 driven in from above in the CMOS layer construction 29.

FIG. 4*b* shows the cell construction comprising the IR radiation collector 1, which additionally has a separate absorber covering layer 27. As a result, by way of example, an absorber layer having very high absorption, but in return low thermal conductivity or low mechanical stability, can be combined with the radiation collector 1, which combines a good thermal conductivity with high mechanical stability, such that high absorption can be combined with high stability and low heat capacity (high response speed).

The additional absorber layer 27 can also be embodied in a multilayered fashion.

FIG. 4*c* illustrates a cross section of a cell according to the invention with mounting of the radiation collector 1 with prop 4 above the pit 18 driven in from above. The radiation collector 1 here extends laterally as far as over the silicon carrying body 24.

In the case of the configuration in FIG. 4*c*, the pit 9 driven in from below likewise has perpendicular or almost perpendicular walls, in order that the slots 5 and the connecting webs 6 are exposed. The central part of the membrane 3 includes the hot contacts 10, which are ideally situated directly below the prop 4, but in principle can also be arranged at other locations in the region of the central part of the membrane 3.

This version in FIG. 4*c* constitutes a particularly expedient thermal insulation of the radiation collector 1 with respect to adjacent structures, if the medium 15 for cost reasons is a gas under normal atmosphere and is not a vacuum. The CMOS layer construction 29 on the silicon carrying body 24 is partly covered here.

FIG. 4*d* illustrates a further configuration according to the invention of the radiation collector 1, showing a possibility of how the area of the radiation collector 1 can be enlarged further if the latter has a step 19 in the edge region, whereby the CMOS layer construction 29 on the silicon carrying body 24 is covered. The version according to FIG. 4*d* allows the most expedient technology with regard to production costs and filling factor.

The step 19 increases the distance with respect to the underlying layer stack and silicon carrying body 24 with the CMOS layer construction 29. This configuration according to the invention reduces the thermal conductivity of the surrounding medium (gas or gas mixture) 15 within the housing and thereby improves the achievable signal sensitivity and temperature resolution for particularly large collectors and thus also particularly high filling levels.

In principle, the edge region of the radiation collector 1 can be led so far that only a small gap remains with respect to the neighboring pixel.

FIGS. 5*a*, *b* show the cross section through a thermopile sensor array cell (pixel) according to the invention with different embodiments for the absorbent layer on the radiation collector 1.

FIG. 5*a* shows the cross section of a pixel cell with radiation collector 1, consisting of a layer stack having a cypress-like absorber layer and a thermally conductive layer underneath. Situated on the radiation collector 1 there are narrow, pointed formations 20 having a large surface area, which are separated from one another by free regions 21 in which the infrared radiation can penetrate directly downward.

FIG. 5b shows the cross section of a cell having honeycomb-like structures 22 on the radiation collector 1. The sidewalls of the structures 23 are suitably structured, such that the non-absorbed portion of the laterally incident thermal radiation is reflected downward toward the IR radiation collector 1 and absorbed there. The structures consist of one or more IR-absorbing materials. Nanocompounds, for example, are used for the larger surface area of the absorber covering layer.

Figure 6A:
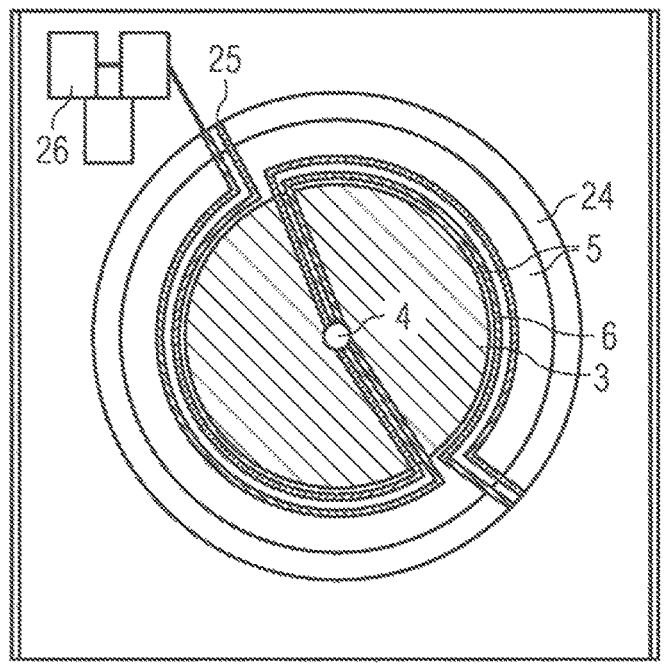
FIGS. 6a . . . e show the plan views of thermopile sensor cells according to the invention with different embodiments for the membrane and thinning and slot variants.

FIGS. 6a . . . e show the plan view of thermopile sensor cells according to the invention with different embodiments for the radiation collector layer and thinning and slot variants.

FIG. 6a illustrates a plan view of a thermopile sensor cell according to the invention in a round form. The central part of the membrane 3 includes the prop 4, on which the radiation collector 1 is mounted (not illustrated in FIG. 6a). Said radiation collector 1 is of a size such that it spans the connecting webs 6 (cf. FIG. 4). Said connecting webs 6 with thermoelements, which are once again thermally decoupled by slots 5, are connected to the silicon carrying body 24 and thereby keep the central part of the membrane 3 in balance with the radiation collector 1. Situated around the sensor cell there are conductive tracks and read-out electronics 26, which are connected to the cold contacts 25. The hot contacts 10 (not illustrated in FIG. 6a) on the membrane 3 are situated in the vicinity of the prop 4. The read-out electronics in proximity to the pixels comprise, for example, low-pass filters, preamplifiers, but can also contain analog-to-digital converters, sample-&-hold elements or switching devices, data storage units or multiplexers, and are characterized in that the individual cells arranged in line or array form each have an electronic signal processing unit per individual cell or at least per four individual cells jointly. The entire edge region around the pixels is usually filled with electronics in proximity to the pixels (the assemblies 26 describe that merely symbolically). In the outer region of the sensor chip (i.e. outside the so-called "focal plane" with the individual thermoelement cells), further electronics for controlling the array and the signal read-out are integrated; that can be, e.g. besides amplifiers and drivers, e.g. multiplexers, AD converters, EEPROM, RAM memory and microprocessors and also the interface assembly.

Figure 6B:
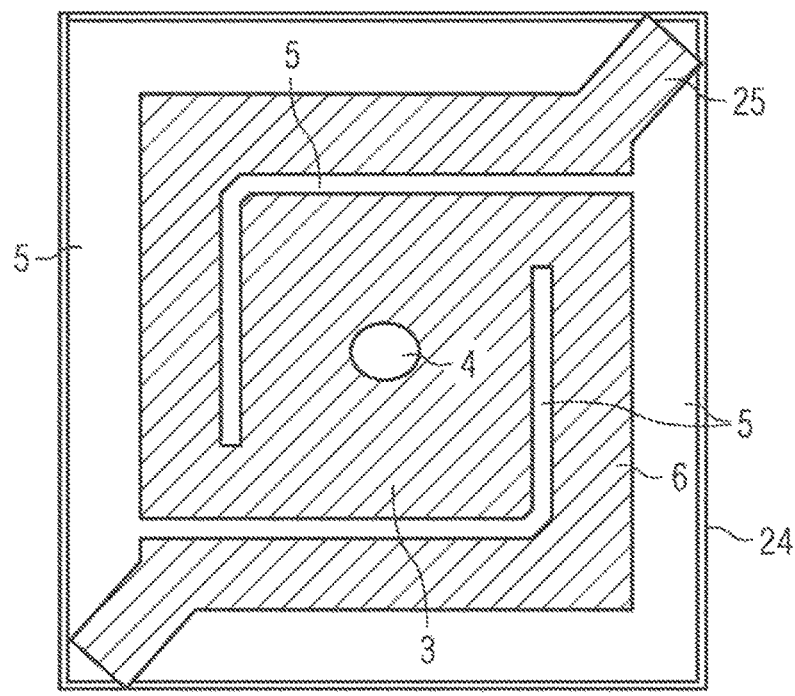

FIG. 6b is a plan view of a thermopile sensor cell according to the invention in rectangular form and with a round prop 4. The central part of the membrane 3 includes the prop 4, on which the radiation collector 1 is mounted (not illustrated in FIG. 6b). Said radiation collector 1 is of a size such that it spans the connecting webs 6 and the slots 5 (cf. e.g. FIG. 4). These connecting webs 6 with thermoelements are arranged in an L-shape around the central part of the membrane 3; as a result, the sensitivity of the sensor cell can be increased. The surrounding electronics are connected via surrounding cold contacts 25 at the transitions between the connecting webs 6 and the silicon carrying body 24.

Figure 6C:
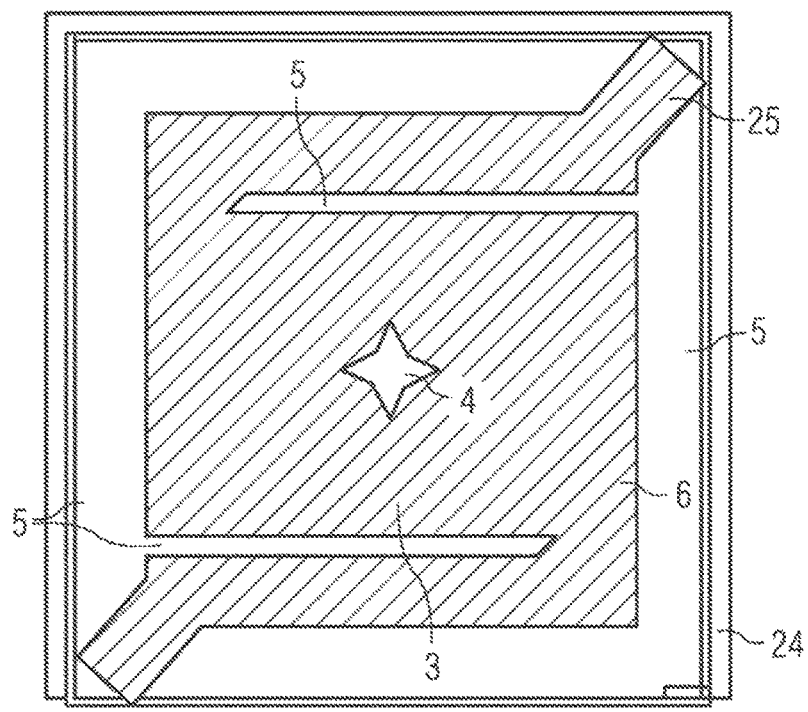

FIG. 6c shows a plan view of a thermopile sensor cell according to the invention in rectangular form and with a prop 4 having a star-shaped cross section. The central part of the membrane 3 includes the prop 4, on which the radiation collector 1 is mounted (not illustrated in FIG. 6c). Said radiation collector 1 is of a size such that it projects as far as just before the cold contacts 25 situated on the silicon carrying body 24. The connecting webs 6 with thermoelements are arranged only on two of the four sides of the central part of the membrane 3, in order to increase the absorption area on the membrane 3.

Figure 6D:
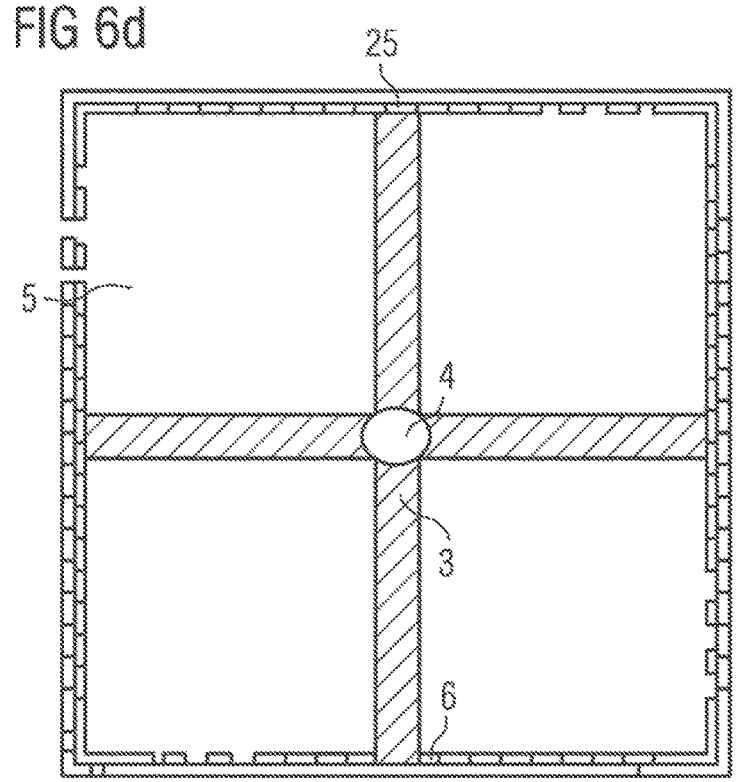

FIG. 6d shows a plan view of a thermopile sensor cell according to the invention in rectangular form and with a round prop 4. The central part of the membrane 3 is of the same size as the prop 4 itself, on which the radiation collector 1 is mounted (not illustrated in FIG. 6d). Said radiation collector 1 is of a size such that it projects as far as just before the cold contacts 25. The connecting webs 6 with thermoelements are fitted to the sides of the central part of the membrane 3 in a cross-shaped fashion, in order to produce stress relaxation and to be able to hold the radiation collector 1 stably above the membrane 3. The slot region 5 is situated between the connecting webs 6 and the silicon carrying body 24.

It is also possible to widen the connecting webs 6 and to pack thermoelements more fully such that only a thin slot 5 for gas exchange remains.

FIG. 6e shows the plan view of a thermopile sensor cell according to the invention in rectangular form and with a prop 4 having a cross-shaped cross section. The central part of the membrane 3 is of the same size as the prop 4 itself, on which the radiation collector 1 is mounted (not illustrated in FIG. 6e). The connecting webs 6 with thermoelements are arranged in a meandering fashion around the central part of the membrane 3, in order to be able to accommodate a large number of thermoelements having a long length (and thus low thermal dissipation). The slot region 5 is situated between the connecting webs 6 and the silicon carrying body 24. The cold contacts 25 are situated at the ends of the connecting webs 6 on the silicon carrying body 24, whereas the hot contacts are arranged on the membrane 3 near the prop 4.

LIST OF REFERENCE SIGNS

1 Radiation collector
2 Surrounding CMOS structures
3 Central part of the membrane
4 Prop
5 Slot
6 Connecting webs
7 Mechanical stabilization webs
8 Area between membranes
9 Cavity
10 Hot contacts
11 Carrier substrate
12 Cap
13 Imaging lens/entrance optical system
14 Thermopile sensor array chip
15 Gas or gas mixture
16 Thermoelectric sensor element (pixel)
17 Radiation collector construction
18 Pit, driven in from above
19 Step of the radiation collector in the edge region
20 Pointed formations having high surface area
21 Free regions between pointed formations
22 Honeycombs or honeycomb-like structures
23 Sidewalls of the honeycombs
24 Silicon carrying body
25 Cold contacts
26 Electronics
27 Absorber covering layer on radiation collector
28 Plug connector
28' Contact element
29 CMOS layer construction 30 Substrate of the sensor chip
31 Polysilicon conductive tracks lying one above another

The invention claimed is:
1. A thermopile infrared sensor structure, comprising:
a housing filled with a medium,
a baseplate, which has electrical connections to the outside and which is closed with an optical assembly,
a sensor chip is applied on the baseplate in the housing, the sensor chip carrying a plurality of thermoelectric sensor element structures with "hot contacts" of the thermopile sensor structures situated on a central part of individual membranes stretched across a respective cavity driven in a silicon carrying body, wherein the cavity is defined in part by surrounding walls and is surrounded by a frame like silicon carrying body connected with the membrane by connecting webs separated from the membrane and the surrounding frame like silicon body by narrow slots,
wherein "cold contacts" of the thermopile sensor structures are situated on or in the vicinity of the silicon carrying body,
a CMOS structure on the frame like carrying body, the connecting webs, and the membrane, wherein the CMOS structure includes a pit driven from above in an upper portion of the CMOS structure, and
a radiation collector construction situated within the pit above each individual membrane of the sensor element structure, the radiation collector construction spanning across the cavity, including at least the membrane and a part of the web and the radiation collector provided with a high thermal conductivity, a low heat capacity and a low reflectivity, the radiation collector including at least a single layer structure with at least an absorbing surface on the upper side,
wherein the radiation collector structure spans an area greater than the central part of the individual membrane, including at least the membrane and a part of the web,
wherein the radiation collector structure comprises the radiation collector supported by at least one prop disposed on the membrane, the prop thermally connecting the underlying central part of the membrane to the radiation collector structure, and
wherein the hot contacts disposed on the membrane and below or in the vicinity of the at least one prop and the cold contacts on or in the vicinity of the silicon carrying body.

2. The thermopile infrared sensor structure as claimed in claim 1, wherein the medium enclosed in the housing is a gas or gas mixture having a very low pressure (e.g. vacuum) or a gas having a significantly poorer thermal conductivity than air or nitrogen, such as Xe, Kr or Ar.

3. The thermopile infrared sensor structure as claimed in claim 1, wherein the cavities are driven into the silicon carrying body from the front side.

4. The thermopile infrared sensor structure as claimed in claim 1, wherein the cavities are driven into the silicon carrying body from the rear side and are provided with perpendicular or almost perpendicular sidewalls.

5. The thermopile infrared sensor structure as claimed in claim 1, wherein the membranes or the cavities have square, rectangular, polygonal or round forms.

6. The thermopile infrared sensor structure as claimed in claim 1, wherein the signal processing of the individual sensor elements contains preamplifiers and low-pass filters for limiting the noise bandwidth.

7. The thermopile infrared sensor structure as claimed in claim 1, wherein the radiation collector and the at least one prop are formed of the same material and have been produced jointly in one process.

8. The thermopile infrared sensor structure as claimed in claim 1, wherein one or more connecting webs are arranged between adjacent radiation collectors or the radiation collector constructions.

9. The thermopile infrared sensor structure as claimed in claim 1, wherein the props have round, angular, or tubular cross sections.

10. The thermopile infrared sensor structure as claimed in claim 1, wherein the membranes are connected to the silicon carrying body via narrow and thin webs, and in that the thermoelements with the functional layers are led over the webs and connect the hot contacts on the central region of the membrane to "cold contacts" above the silicon carrying body.

11. The thermopile infrared sensor structure as claimed in claim 1, wherein the radiation collectors are of approximately the size of the underlying cavity in the silicon carrying body.

12. The thermopile infrared sensor structure as claimed in claim 1, wherein the radiation collectors extend over the edge of the cavity.

13. The thermopile infrared sensor structure as claimed in claim 1, wherein the radiation collectors have a step or protuberance in the edge region.

14. The thermopile infrared sensor structure as claimed in claim 1, wherein radiation collectors are thinned in the edge region.

15. The thermopile infrared sensor structure as claimed in claim 1, wherein the radiation collectors are covered with a thin absorber layer.

16. The thermopile infrared sensor structure as claimed in claim 1, wherein the radiation collectors have a structured surface having pointed formations and free regions therebetween.

17. The thermopile infrared sensor structure as claimed in claim 1, wherein the radiation collectors have a honeycomb-shaped surface.

18. The thermopile infrared sensor structure as claimed in claim 1, wherein at least one part of the signal processing is integrated on the same semiconductor substrate.

19. The thermopile infrared sensor structure as claimed in claim 18, wherein at least one part of the signal processing of the individual sensor elements (pixels) is arranged in the edge region of the silicon carrying body around each sensor element.

20. The thermopile infrared sensor structure as claimed in claim 19, wherein at least per every four individual pixels jointly, an individual signal processing unit is arranged around each sensor element in the edge region surrounding the pixels.

21. The thermopile infrared sensor structure as claimed in claim 18, wherein at least one part of the signal processing of the individual sensor elements (pixels) is arranged in the edge region of the silicon carrying body around each sensor element and contains, for example, preamplifiers and low-pass filters for limiting the noise bandwidth and/or analog/digital converters and switching devices.

22. The thermopile infrared sensor structure as claimed in claim 1, wherein the pit containing the radiation collector construction is driven in from above, and the cavity defined by the carrying body is driven in from below.

23. The thermopile infrared sensor structure as claimed in claim 1, wherein the radiation collector and the prop are formed of a same material and are produced in a same process.

* * * * *